(12) United States Patent
Wilson

(10) Patent No.: US 8,321,496 B2
(45) Date of Patent: Nov. 27, 2012

(54) USER EVALUATION OF CONTENT ON DISTRIBUTED COMMUNICATION NETWORK

(75) Inventor: David J. Wilson, Austin, TX (US)

(73) Assignee: Half.com, Inc., San Jose, CA (US)

( * ) Notice: Subject to any disclaimer, the term of this patent is extended or adjusted under 35 U.S.C. 154(b) by 1897 days.

(21) Appl. No.: 09/731,019

(22) Filed: Dec. 7, 2000

(65) Prior Publication Data

US 2002/0165905 A1 Nov. 7, 2002

Related U.S. Application Data

(60) Provisional application No. 60/170,362, filed on Dec. 13, 1999.

(51) Int. Cl.
*G06F 15/16* (2006.01)
*G06F 17/30* (2006.01)

(52) U.S. Cl. ........ 709/203; 707/722; 707/723; 707/748; 707/752

(58) Field of Classification Search ............ 705/12, 705/10, 26, 27; 709/217, 219, 203; 707/10
See application file for complete search history.

(56) References Cited

U.S. PATENT DOCUMENTS

| | | | |
|---|---|---|---|
| 3,947,669 A * | 3/1976 | Simmons et al. ............ 705/12 |
| 5,537,618 A * | 7/1996 | Boulton et al. ............ 345/745 |
| 5,737,479 A | 4/1998 | Fujinami | |
| 5,774,121 A | 6/1998 | Stiegler | |
| 5,790,426 A | 8/1998 | Robinson | |
| 5,794,237 A * | 8/1998 | Gore, Jr. ............ 707/5 |
| 5,867,799 A | 2/1999 | Lang et al. | |
| 5,872,850 A * | 2/1999 | Klein et al. ............ 705/51 |
| 5,875,432 A * | 2/1999 | Sehr ............ 705/12 |
| 5,884,282 A * | 3/1999 | Robinson ............ 705/7.33 |
| 5,950,172 A | 9/1999 | Klingman | |
| 6,038,596 A * | 3/2000 | Baldwin et al. ............ 709/219 |
| 6,064,980 A | 5/2000 | Jacobi et al. | |
| 6,092,049 A | 7/2000 | Chislenko et al. | |
| 6,112,186 A | 8/2000 | Bergh et al. | |
| 6,230,185 B1 * | 5/2001 | Salas et al. ............ 715/513 |
| 6,275,811 B1 | 8/2001 | Ginn | |
| 6,362,837 B1 * | 3/2002 | Ginn ............ 707/5 |
| 6,405,159 B2 | 6/2002 | Bushey et al. | |

(Continued)

OTHER PUBLICATIONS

"www.epinions.com," Oct. 12, 1999.*

(Continued)

*Primary Examiner* — Scott Christensen
(74) *Attorney, Agent, or Firm* — Schwegman Lundberg & Woessner, P.A.

(57) ABSTRACT

A method and system for identifying and sorting items of content, such as product/service reviews in a database coupled to a distributed communication network such as the Internet. Content from the database is displayed on a client display connected to the database over the network. An interactive element associated with the displayed content item is provided on the client display, which a user clicks to indicate that the user has found the displayed item helpful (such as in determining whether or not to purchase or to use a product/service in the case of a displayed product or service review). The database keeps track of the number of indications and stores the number as a count of the number of indications for the content. The number of indications associated with an item of content on the client display is then displayed together with the content. A client may sort content items according to the number of indications received.

7 Claims, 3 Drawing Sheets

U.S. PATENT DOCUMENTS

| | | |
|---|---|---|
| 6,405,175 B1 | 6/2002 | Ng |
| 6,466,918 B1 | 10/2002 | Spiegel et al. |
| 6,772,139 B1 * | 8/2004 | Smith, III .................. 707/10 |

OTHER PUBLICATIONS

@Home, Netscape, Yahoo! Veterans Announce epinions.com.*

Kuehl, Claudia, "New world of Web review," Internet World, Dec. 1, 1999.*

"On-Line Help Reviewer Facility," IBM Technical Disclosure Bulletin, Mar. 1994.*

Krigel, B.; "Revamped Deja News debuts"; cnet.com/news.com; May 10, 1999.*

Festa, P.; "Have an Epinion?"; cnet.com/news.com; Jul. 9, 1999.*

NOWTHIS.COM, blog entry, Nov. 24, 1999.*

Amazon Home Page (http://amazon.com). Posted Oct. 13, 1999 and downloaded from <http://web.archive.org/web/19991013091817/http://amazon.com/>.*

Guglielmo, Connie, "BizRate Lets Consumers Rate Sites", *Interactive Week*, 4(22), (Aug. 4, 1997).

MTB Review, "http://www.mtbr.com", http://www.mtbr.com, The attached mtbr.pdf which includes screen shots from a Mountain Biking Resource Review web site taken from the Wayback Machine Internet Archive located at http://www.archive.org/web/web.php., (Archived Jan. 25, 1997).

Wolverton, Troy, "Productopia launches product review site", CNETNews.com, (Jul. 21, 1999).

"U.S. Appl. No. 09/412,893, Advisory Action mailed May 19, 2003", 3 pgs.

"U.S. Appl. No. 09/412,893, Final Office Action mailed Jan. 6, 2003", 8 pgs.

"U.S. Appl. No. 09/412,893, Non-Final Office Action mailed Sep. 9, 2002", 7 pgs.

"U.S. Appl. No. 09/412,893, Preliminary Amendment mailed May 3, 2000", 7 pgs.

"U.S. Appl. No. 09/412,893, Response filed May 6, 2003 to Final Office Action mailed Jan. 6, 2003", 4 pgs.

"U.S. Appl. No. 09/412,893, Response filed Dec. 9, 20002 to Non-Final Office Action mailed Sep. 9, 2002", 6 pgs.

"U.S. Appl. No. 09/412,893, Advisory Action mailed Jun. 19, 2006", 3 pgs.

"U.S. Appl. No. 09/412,893, Advisory Action mailed Oct. 11, 2005", 3 pgs.

"U.S. Appl. No. 09/412,893, Final office action mailed Feb. 17, 2004", 16 pgs.

"U.S. Appl. No. 09/412,893, Final office action mailed Mar. 27, 2006", 32 pgs.

"U.S. Appl. No. 09/412,893, Final office action mailed Jul. 26, 2005", 22 pgs.

"U.S. Appl. No. 09/412,893, Final office action mailed Nov. 30, 2004", 14 pgs.

"U.S. Appl. No. 09/412,893, Non final office action mailed Mar. 7, 2005", 15 pgs.

"U.S. Appl. No. 09/412,893, Non final office action mailed Jul. 22, 2004", 14 pgs.

"U.S. Appl. No. 09/412,893, Non final office action mailed Oct. 21, 2003", 14 pgs.

"U.S. Appl. No. 09/412,893, Non final office action mailed Nov. 22, 2005", 20 pgs.

"U.S. Appl. No. 09/412,893, Response filed Jan. 22, 2004 to non final office action mailed Oct. 21, 2003", 26 pgs.

"U.S. Appl. No. 09/412,893, Response filed Feb. 21, 2006 non final office action mailed Nov. 22, 2005", 16 pgs.

"U.S. Appl. No. 09/412,893, Response filed May 30, 2006 final office action mailed Mar. 27, 2006", 6 pgs.

"U.S. Appl. No. 09/412,893, Response filed Jun. 4, 2004 to final office action mailed Feb. 17, 2004", 15 pgs.

"U.S. Appl. No. 09/412,893, Response filed Jun. 7, 2005 non-final office action mailed Mar. 7, 2005", 13 pgs.

"U.S. Appl. No. 09/412,893, Response filed Sep. 24, 2005 final office action mailed Jul. 26, 2005", 15 pgs.

"U.S. Appl. No. 09/412,893, Response filed Sep. 29, 2004 non-final office action mailed Jul. 22, 2004", 15 pgs.

U.S. Appl. No. 09/412,893, Appeal Brief filed Aug. 2, 2006, 26 pgs.

U.S. Appl. No. 09/412,893, Non Final Office Action mailed Sep. 9, 2002, 7 pgs.

U.S. Appl. No. 09/412,893, Non-Final Office Action mailed Jul. 20, 2009, 2 pgs.

U.S. Appl. No. 09/412,893, Preliminary Amendment filed Sep. 8, 2003, 23 pgs.

U.S. Appl. No. 09/412,893, Response filed Dec. 9, 2002 to Non Final Office Action mailed Sep. 9, 2002, 6 pgs.

Aho, Alfred V., "Data Structures and Algorithms: Chapter 3 Trees", *Addison-Wesley Publishing Company*, Menlo Park, California, (1983),75-89.

Aho, A. V., "Directed Graphs", *Date Structures and Algorithms*, Addison-Wesley Publishing Company, Menlo Park, California,(1983),198-219.

AUDIOREVIEW.COM, "NAD 412 Reviews, Found on WayBackMachine", http://web.archive.org/web/19990203004345/www.audioreview.com/reviews/Turner/$nad_{13}$ 412_turner.shtml, Online Reviews,(Feb. 3, 1995).

BEYOND.COM, "IMS Web Spinner Personal V1.26 for Win95/98/NT", http://web.archive.org/web/20000125152017/www.beyond.com/PKSN104373/prod.htmcrewiew, (1998-2000),3 pages.

BUYCLEARANCE.COM, "The Internet Clearance Superstore: Product Information", http://web.archive.org/web/20000124120021/www.buy.com/clearance/product.asp?sku=70000254, [Field error on website],1 page, Posted Jan. 24, 2000.

Consumer Review!, "49,000 Product Reviews by Consumers for Consumers", http://web.archive.org/web/19981206010249/http://www.consumerreview.com, (1996-1998).

EPINIONS.COM, "Epinions.com", http://web.archive.org/web/19991129024603/www.epinions.com/, (1999).

Kornblum, Janet , "Consumer Reports an online win", CNET News.com, *Online Article*, http://news.com.com/2100-1023-217386.html,(Nov. 2, 1998),2 pages.

Krigel, Beth L., "Big changes ahead for Deja News", CNET News.com, *Online Article*, http://news.com.com/2100-1023-225101.html,(Apr. 28, 1999),3 pages.

Miller, Michael J., "The Best Products of 1999 Revealed", *ZDNet*, http://www.zdnet.com/anchordesk/stories/story/0,10738,5019537,00.html,(Dec. 13, 1999),2 pages.

Nielsen, Jakob , "Reputation Managers are Happening", useit.com, *Alertbox*, (Sep. 5, 1999),4 pages.

Patience, Nick , "Epinons Launches Online Shopping Guide Built on Trust", *Computergram International*, n3744, The Gale Group Newsletter,(Sep. 10, 1999).

PRICESCAN.COM, "PriceSCAN: Your Unbiased Guide to the Lowest Prices on Books, Computers, Electronic . . . ", http://web.archive.org/web/19991117123352/www.pricescan.com, (1997-99),1 page.

Product Reviewnet!, "Welcome to Product ReviewNet! The Premier Online Source for Product Review Abstracts", http://web.archive.org/web/19981201205356/www.productreviewnet.com/splash.html. (1996-1998).

Product Reviewnet!, "Welcome to Product ReviewNet! Your Source for Product Review Information", http://web.archive.org/web/19991114054251/www.productreviewnet.com/splash.html, 1 page.

Sabater, Jordi , "Regret: A reputation model for gregarious societies", *IIIA-Artificial Intelligence Research Intitute, CSIC—Spanish Scientific Research Council*, Bellaterra, Catalonia, Spain.

Vendelo, Morten T., "Narrating Corporate Reputation: Becoming Legitimate Through Storytelling", *International Studies of Management & Organization* v28n3, (Fall 1998), 120-137.

Zacharia, Giorgos , "Collaborative Reputation Mechanisms in Electronic Marketplaces", *Proceedings of the 32nd Hawaii International Conference on System Sciences*, (1999).

* cited by examiner

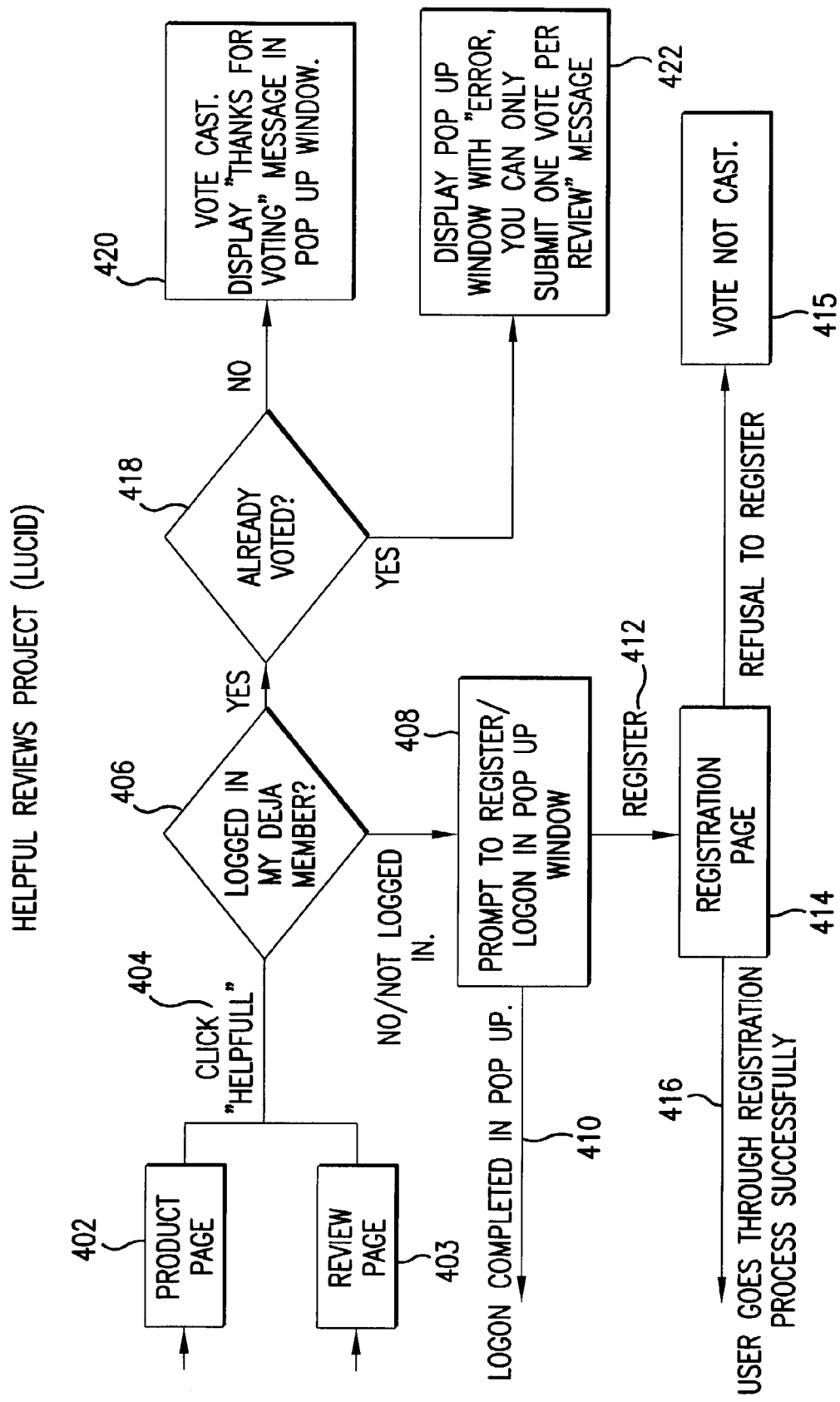

USER EVALUATION OF CONTENT ON DISTRIBUTED COMMUNICATION NETWORK

CROSS REFERENCE TO RELATED APPLICATION

This application claims the benefit of the filing date of provisional application Ser. No. 60/170,362, filed Dec. 13, 1999.

BACKGROUND OF THE INVENTION

1. Field of the Invention

The present invention relates generally to interactive user tools on a distributed communication network, such as the Internet. More particularly, the present invention relates to a system and method for enabling users of content on a distributed communication network to collectively indicate the degree of helpfulness or usefulness of individual items of contents, such as for example reviews of commercially available products and/or services, usenet postings, news articles, etc., by interactively voting or indicating that particular items of content were helpful or otherwise valuable to the user. Subsequent users then are able to sort retrieved items of content by degree of helpfulness or usefulness according to the number of previous users who have indicated that the individual items of content were helpful or otherwise valuable.

2. Background and Related Art

It is generally known in the art to survey consumers regarding the quality of particular products and/or services, and to publish or advertise the results of the survey. Recently, with the rapid technological advancement of the Internet, it has become possible for individual consumers to provide narrative reviews of products and/or services, in addition to standardized scaled ratings. Such reviews can be stored in a server database and retrieved and displayed to users (clients) in response to search queries using known search engines.

As the number of individual consumers participating in on-line product ratings and posting product reviews continues to grow, so does the amount of information available for subsequent users to evaluate.

In addition to consumer reviews or ratings 6f products and services, it is possible to retrieve a very large of amount of information from the Internet relating to any subject at all. For example, information can be retrieved in the form of usenet postings, professional reviews, news articles, on-line catalogs, video and audio clips, etc.

Consequently, there exists a need in the art to provide a methodology by which users may indicate the particular helpfulness or usefulness of certain individual items of content, whereby subsequent users will be able to sort available reviews by the degree of indicated helpfulness or usefulness, and thereby reduce the amount of information for the user to evaluate, based on the prior experience of other users.

SUMMARY OF THE INVENTION

The present invention provides a method and system that fulfills the existing need in the art as described above, by providing an interactive user tool on a distributed communication network, whereby a user of an on-line content database can provide an indication that a particular review has been helpful or otherwise valuable to the user in assessing the quality of the content, e.g., in the case of a product review, in determining whether to purchase or use the reviewed product or service. A tally of such indications is stored in a database associated with the content, and is displayed to subsequent users who retrieve or otherwise view the content.

In particular, the present invention provides a method for sorting user-generated reviews (such as for products or services) in a database coupled to a distributed communication network, comprising the steps of displaying reviews from the database on a client display connected to the database over the network, providing an interactive element associated with the displayed review on the client display, which when clicked by a user indicates that the user has found the displayed review helpful in determining whether or not to purchase or to use the product/service at issue, receiving at the database an indication that the user has clicked the interactive element, and incrementing a count of a stored number of votes for said review in response to said indication, and displaying the number of indications associated with a review on said client display together with the review.

According to another aspect, the present invention provides a method for sorting items of content in a database coupled to a distributed communication network, comprising the steps of displaying items of content from the database on a client display connected to the database over the network, providing an interactive element associated with the displayed review on the client display, which when clicked by a user indicates that the user has found the displayed item of content helpful in achieving the purpose the content was generated to achieve (such as communicating a particular news story, rating a particular product, communicating an opinion, etc.) receiving at the database an indication that the user has clicked the interactive element, and incrementing a count of a stored number of votes for said item of content in response to said indication, and displaying the number of indications associated with an item of content on said client display together with the review.

BRIEF DESCRIPTION OF THE DRAWINGS

The invention will be described in detail with reference to the following drawings in which:

FIG. 4 is a flow diagram showing a basic program flow for recording an individual user's indications that such user found a particular item of content to be helpful or otherwise valuable to the user, according to one embodiment of the present invention.

DETAILED DESCRIPTION OF THE PREFERRED EMBODIMENTS

Figure 1:
FIG. 1 is a screen display which shows stored items of content, and the provision of an interactive element or icon that allows a user to designate a particular item of content as being helpful or otherwise valuable to the user, according to one embodiment of the present invention.

FIG. 1 is a screen display illustrating one particular example of the present invention. According to the example, a user of an on-line consumer products and services ratings and reviews site is interested in computer operating systems, and in particular the AmigaOS operating system. A product identification line 100 identifies the AmigaOS as the product whose ratings and reviews are presented on the display.

A number of scaled numerical ratings 102 based on different criteria are provided for the product, in both graphical and numerical form. In addition to the numerical scaled ratings, the available consumer reviews for the product are indicated in review label 104. In the example, 468 consumer reviews have been posted for the product and stored in the database. One of the stored reviews 106 is displayed at the bottom of the screen. To the right of the review, an indication 112 is provided of the number of users who have found the displayed review helpful. An interactive element or icon 110 is provided adjacent to the displayed review, which enables a user to indicate whether she finds the review helpful by clicking on the element 110 with a pointing device, as is well known in the art.

Figure 2:
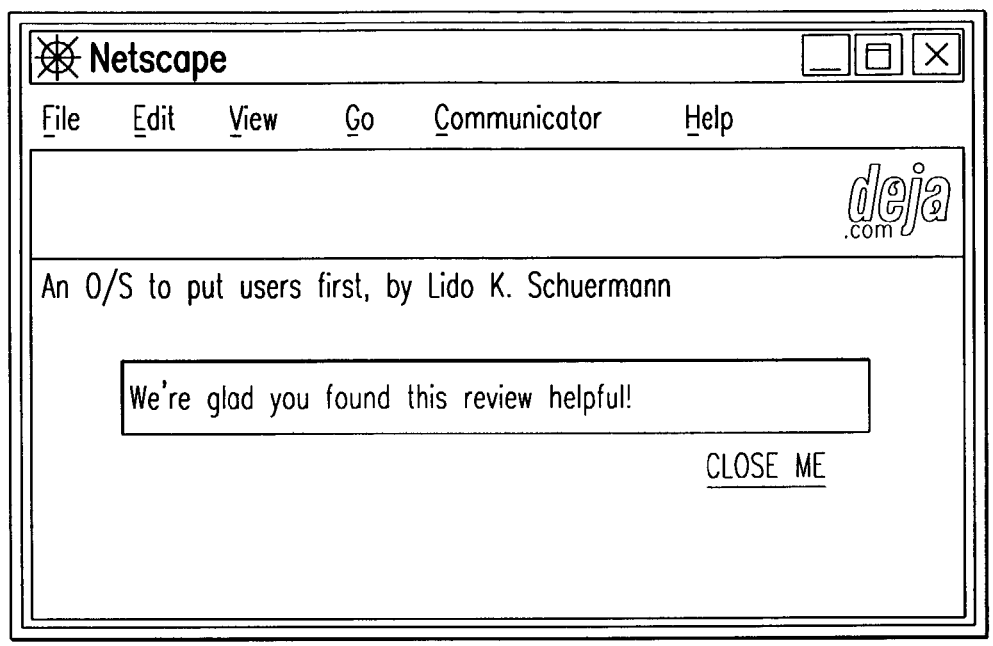
FIG. 2 is a screen display of a pop-up window confirming the recording of a user's indication that a particular item of content was found to be helpful.
Figure 3:
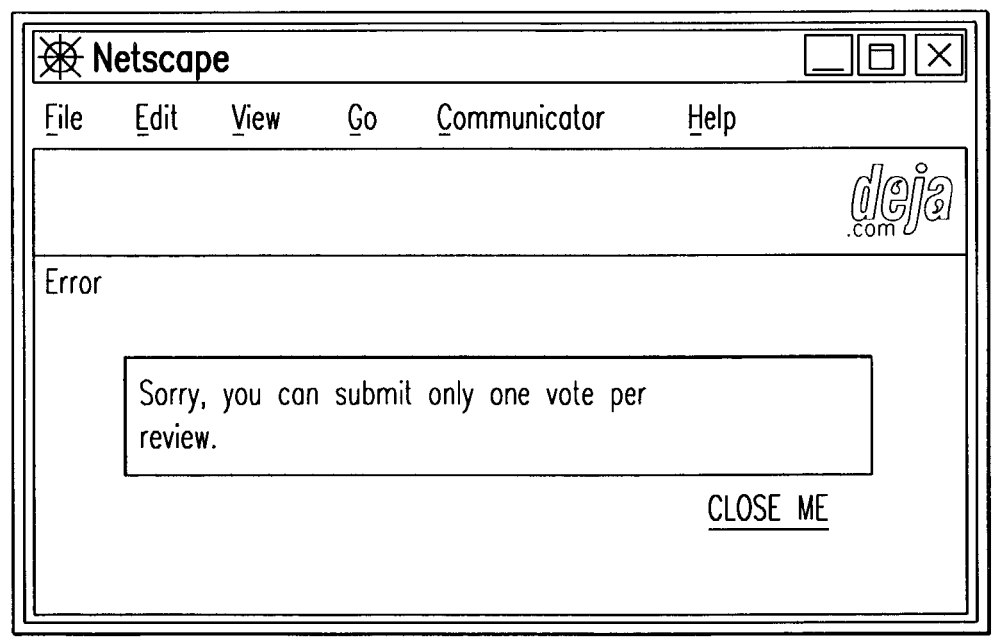
FIG. 3 is a screen display of a pop-up window declining to record a user's indication that an item of content is helpful in the event that the user has already interactively indicated as such.

Once the user's indication with respect to the displayed review has been received and counted, a pop-up window can be displayed on the user's display screen, as shown for example in FIG. 2, which confirms the receipt of the user's indication by the database interface. If the user has already submitted an indication for the displayed review as being helpful or otherwise valuable, a pop-up window as shown in FIG. 3 may be displayed to the user informing her that only one indication per user per review will be accepted.

FIG. 4 is a flow diagram illustrating an example of a process according to one preferred embodiment of the invention whereby a user may submit an indication for a product/service review as being helpful. The example provided hereinafter relates to review of products and/or services for purposes of explanation; however, it is emphasized that the present invention is not limited to product and/or service reviews, but as explained above can be used to filter or sort any individual item of content retrievable by a client from a database.

As shown in FIG. 4, the user may be at either a product page at step 402 (as shown in FIG. 1), or a review page at step 403, in which a "helpful" element or icon is displayed. In either case, the page contains a number of reviews of different products/services by the same individual reviewer (alternatively, the viewer may be at any page which displays items of content). At step 404, the user clicks on the "helpful" element, and at step 406 it is determined whether the user is logged onto the server as a registered user. If not, the user is prompted at step 408 to register with the server, or to logon to the server (if the user has previously registered). The prompting step may be carried out by displaying a pop-up window to the user.

At step 410, a previously registered user logs on to the server by entering her user name and password in appropriate fields, and the user is then returned to the product page or review page from which she clicked on the "helpful" element. An unregistered user will click a register element in the pop-up window at step 412, whereby the user will be directed to a register page 414. The unregistered user enters her personal information into the appropriate fields in the register page, and submits the information at step 416, whereby the user is successfully registered and logged in, and is brought back to the product or review page where the user again clicks the "helpful" element, which now tallies the indication.

In an alternative embodiment, once a user has been successfully logged in, the user can be brought directly to step 418 (described below) without being required to again click the "helpful" element.

Once the user is logged on to the server as a registered user, at step 418 previously stored user data is checked to determine whether that user has already submitted an indication for a particular review as being helpful. This step prevents users from submitting such indication more than once, and thus prevents the artificial inflation of the appearance of helpfulness of reviews. If it is determined that the user has already submitted an indication, at step 422 a pop-up window as shown in FIG. 3 is displayed, notifying the user of an error because the user has already submitted an indication. The user then can close the pop-up window. This process will repeat itself if the user continues to click the "helpful" element for a review for which the user has already submitted an indication.

If the user has not already submitted an indication for the review, at step 420 the user's indication is received and counted, and a pop-up window as shown in FIG. 2 is displayed, confirming to the user that the indication has been tallied.

As shown in FIG. 1, reviews may be sorted by number of indications of helpfulness or by another criterion as a default. If the user desires to change the order by which the reviews are sorted, the user may click the drop-down menu item 108 to choose alternative sorting criteria by which the reviews will be sequentially displayed. For example, the user may view reviews by submission date, highest rating, or lowest rating. When more than one person has submitted an indication for a particular review, the text string 112 is replaced with "XX people have found this review helpful." where XX is the number of indications by different users received for the review.

According to a further aspect of the invention, a reviewer's "hall of fame" page may be provided, which lists the individual users who have received the most "helpful" indications for reviews they have written. In this way, subsequent users may view the reviewers with the highest number of helpful indications on the "hall of fame" page. This information then may be used by the user in a search, such as by searching for all reviews written by a particular reviewer, or by adding the reviewer's name to a search string for a particular product.

The invention having been thus described, it will be apparent to those skilled in the art that the same may be varied in many ways without departing from the spirit and scope of the inventions. For example, while the invention has been described with respect to rating reviews or other content as to "helpfulness," it is possible to rate the same on alternative characteristics such as writing style, wit or another subjective criterion, or on multiple subjective criteria. All such modifications are intended to be encompassed by the following claims.

What is claimed is:

1. A method for identifying as being helpful or otherwise valuable product/service reviews in a database coupled to a distributed communication network, the method comprising:

displaying product/service reviews from the database on a client display connected to the database over the network;

providing an interactive element associated with each of the displayed reviews on the client display, which when clicked by a user, indicates that the user has found a displayed review associated with a product/service helpful in determining whether or not to purchase or use the product/service;

receiving at the database an indication that the user has clicked the interactive element, and incrementing a count of a stored number of indications for the review (1) in response to the indication and (2) if the stored number of indications does not exceed one indication for the review from the user; and displaying the count of the stored number of indications for the review on the client display together with the review;

sending an error to the user if the interactive element is clicked more than once by the user for the review;

sorting the reviews in ascending or descending order as a function of the number of indications tallied for each review, and sequentially displaying the reviews in the sorted order; and recurrently tallying the number of indications and re-sorting the reviews for a subsequent display.

2. The method of claim 1, further comprising:

compiling a list of reviewers including names of those reviewers who have received a highest number of indications for their product/service reviews; and displaying the list of reviewers on the client display.

3. A system for identifying as being helpful or otherwise valuable product/service reviews in a database coupled to a distributed communication network, the system comprising:

a first computer coupled to the database over the network, the first computer having a display to display product/service reviews from the database, provide an interactive element associated with each of the displayed reviews, which when clicked by a user, indicates that the user has found a displayed review associated with a product/service helpful in determining whether or not to purchase or use the product/service, and display a count of the stored number of indications for the review together with the review; and a second computer coupled to the first computer, the second computer to receive an indication that the user has clicked the interactive element, and to increment a count of the stored number of indications for the review (1) in response to the indication and (2) if the stored number of indications does not exceed one indication for the review from the user and wherein the second computer is further to send an error to the first computer if the interactive element is clicked more than once by the user for the review, wherein the first computer is utilized to display the error to the user; and wherein the second computer is further to sort the reviews in ascending or descending order as a function of the number of indications tallied for each review, sequentially display the reviews in the sorted order on the first computer, and recurrently tally the number of indications and re-sort the reviews for subsequent display on the first computer.

4. The system of claim 3, wherein the second computer is further to compile a list of reviewers including names of those reviewers who have received a highest number of indications for their product/service reviews, and to provide the list of reviewers to the first computer.

5. The system of claim 4, wherein the first computer is further to display the list of reviewers.

6. A non-transitory machine-readable medium having stored thereon data representing a set of instructions for identifying as being useful or otherwise valuable product/service reviews in a database coupled to a distributed communication network, the sets of instructions which, when executed by a machine, cause the machine to:

display product/service reviews from the database on a client display connected to the database over the network;

provide an interactive element associated with each of the displayed reviews on the client display, which when clicked by a user, indicates that the user has found a displayed review associated with a product/service helpful in determining whether or not to purchase or use the product/service;

receive at the database an indication that the user has clicked the interactive element, and incrementing a count of a stored number of indications for the review (1) in response to the indication and (2) if the stored number of indications does not exceed one indication for the review from the user;

display the count of the number of indications for the review on the client display together with the review; and wherein the sets of instructions which, when executed by the machine, further cause the machine to sort the reviews in ascending or descending order as a function of the number of indications tallied for each review, sequentially display the reviews in the sorted order and recurrently tally the number of indications and re-sort the reviews for a subsequent display.

7. The machine-readable medium of claim 6, wherein the sets of instructions which, when executed by the machine, further cause the machine to:

compile a list of reviewers including names of those reviewers who have received a highest number of indications for their product/service reviews; and display the list of reviewers on the client display.

\* \* \* \* \*